(12) United States Patent
Dalton et al.

(10) Patent No.: US 11,475,290 B2
(45) Date of Patent: Oct. 18, 2022

(54) STRUCTURED MACHINE LEARNING FOR IMPROVED WHOLE-STRUCTURE RELEVANCE OF INFORMATIONAL DISPLAYS

(71) Applicant: Google LLC, Mountain View, CA (US)

(72) Inventors: Jeffrey Jon Dalton, Mountain View, CA (US); Karthik Raman, Sunnyvale, CA (US); Tobias Schnabel, Mountain View, CA (US); Evgeniy Gabrilovich, Saratoga, CA (US)

(73) Assignee: GOOGLE LLC, Mountain View, CA (US)

( * ) Notice: Subject to any disclaimer, the term of this patent is extended or adjusted under 35 U.S.C. 154(b) by 1661 days.

(21) Appl. No.: 15/394,875

(22) Filed: Dec. 30, 2016

(65) Prior Publication Data

US 2018/0189673 A1 Jul. 5, 2018

(51) Int. Cl.
*G06N 3/08* (2006.01)
*G06N 20/00* (2019.01)
(Continued)

(52) U.S. Cl.
CPC .............. *G06N 3/08* (2013.01); *G06F 16/248* (2019.01); *G06F 16/951* (2019.01); *G06F 16/9535* (2019.01); *G06N 20/00* (2019.01)

(58) Field of Classification Search
CPC ........ G06N 20/00; G06N 20/10; G06N 20/20; G06N 3/08; G06F 16/9535; G06F 16/951; G06F 16/248
See application file for complete search history.

(56) References Cited

U.S. PATENT DOCUMENTS 8,856,099 B1 * 10/2014 Lasko ................... G06F 16/951
707/706
2003/0217052 A1 * 11/2003 Rubenczyk ......... G06F 16/3323
(Continued)

FOREIGN PATENT DOCUMENTS

WO    WO 2012/034069    3/2012
WO    WO2012/034069    3/2012

OTHER PUBLICATIONS

Borodin, Allan. "Max-Sum Diversification, Monotone Submodular Functions and Dynamic Updates." PODS' 12, May 21-23, 2012. (Year: 2012).*
(Continued)

*Primary Examiner* — Li B. Zhen
*Assistant Examiner* — Markus A. Vasquez
(74) *Attorney, Agent, or Firm* — Dority & Manning, P.A.

(57) ABSTRACT

The present disclosure provides systems and methods that use machine learning to improve whole-structure relevance of hierarchical informational displays. In particular, the present disclosure provides systems and methods that employ a supervised, discriminative machine learning approach to jointly optimize the ranking of items and their display attributes. One example system includes a machine-learned display selection model that has been trained to jointly select a plurality of items and one or more attributes for each item for inclusion in an informational display. For example, the machine-learned display selection model can optimize a nested submodular objective function to jointly select the items and attributes.

19 Claims, 5 Drawing Sheets

(51) Int. Cl.
  *G06F 16/9535* (2019.01)
  *G06F 16/951* (2019.01)
  *G06F 16/248* (2019.01)

(56) References Cited

U.S. PATENT DOCUMENTS

| | | | | |
|---|---|---|---|---|
| 2011/0029466 | A1* | 2/2011 | Liu | G06F 16/24578 706/12 |
| 2013/0282710 | A1* | 10/2013 | Raghavan | G06F 16/838 707/728 |
| 2015/0269176 | A1* | 9/2015 | Marantz | G06F 16/90324 707/767 |
| 2016/0283998 | A1* | 9/2016 | Pathak | G06Q 30/0627 |
| 2018/0144051 | A1* | 5/2018 | Stoyanov | H04L 67/306 |
| 2018/0181375 | A1* | 6/2018 | Hermet-Chavanne | G06F 16/958 |

OTHER PUBLICATIONS

Waegeman, Willem. "Learning Layered Ranking Functions with Structured Support Vector Machines." Neural Networks 21, 2008. p. 1511-1523. (Year: 2008).*

Ahmed, Amr, et al. "Fair and balanced: Learning to present news stories." Proceedings of the fifth ACM international conference on Web search and data mining. 2012. (Year: 2012).*

Hurley, Neil, and Mi Zhang. "Novelty and diversity in top-n recommendation—analysis and evaluation." ACM Transactions on Internet Technology (TOIT) 10.4 (2011): 1-30. (Year: 2011).*

Dolhansky, Brian, and Jeff Bilmes. "Deep submodular functions: definitions & learning." Proceedings of the 30th International Conference on Neural Information Processing Systems. 2016. (Year: 2016).*

Cao, Zhe, et al. "Learning to rank: from pairwise approach to listwise approach." Proceedings of the 24th international conference on Machine learning. 2007. (Year: 2007).*

Written Opinion of the International Preliminary Examining Authority, dated Jun. 11, 2018, 8 pages.

International Search Report for PCT/US2017/053690 dated Dec. 13, 2017, 12 pages.

Bailey et al., "Evaluating Whole-Page Relevance", 33$^{rd}$ ACM SIGIR Conference on Research and Development in Information Retrieval, Geneva, Switzerland, Jul. 19-23, 2010, pp. 767-768.

Carbonell et al., "The Use of MMR, Diversity-Based Reranking for Reordering Documents and Producing Summaries", 21$^{st}$ Annual International ACM SIGIR Conference on Research and Development in Information Retrieval, Melbourne, Australia, Aug. 24-28, 1998, pp. 335-336.

Cheng et al., "Summarizing Entity Descriptions for Effective and Efficient Human-Centered Entity Linking", 24$^{th}$ International Conference on World Wide Web, Florence, Italy, May 18-22, 2015, pp. 184-194.

Guo et al., "Learning Optimal Subsets with Implicit User Preferences", 21$^{st}$ International Joint Conference on Artificial Intelligence, Pasadena, California, Jul. 11-17, 2009, pp. 1052-1057.

Li et al., "A Greedy Algorithm for the Two-Level Nested Logit Model", Operations Research Letters, vol. 42, Issue 5, Jul. 2014, pp. 319-324.

Wang et al., "Beyond Ranking: Optimizing Whole-Page Presentation", 9$^{th}$ ACM International Conference on Web Search and Data Mining, San Francisco, California, Feb. 22-25, 2016, pp. 103-112.

* cited by examiner

STRUCTURED MACHINE LEARNING FOR IMPROVED WHOLE-STRUCTURE RELEVANCE OF INFORMATIONAL DISPLAYS

FIELD

The present disclosure relates generally to providing informational displays such as may be included, for example, in search results pages. More particularly, the present disclosure relates to using machine learning to improve the whole-structure relevance of hierarchical informational displays.

BACKGROUND

An informational display can be used to convey information to a user. As one example, in response to a search query entered by a user, a search system or other information retrieval system can provide a search results page that includes an informational display that includes information pertinent to the search query. The informational display can identify various items (e.g., documents, products, entities, and/or other items) that are responsive to the search query. Each item can have various attributes associated therewith and, in some instances, at least some of these attributes can be included in the search results page as well.

In one example, an informational display can take the form of a carousel of items such as movies, medical conditions, or other entities that are responsive to a search query. Various attributes such as, movie genre, condition symptoms, or other attributes can also be provided by the informational display for each item included in the carousel.

However, an informational display (e.g., as included in a search results page) typically has a limited amount of space. Therefore, the informational display can present only a limited number of items and a limited number of attributes (if any) for each item. Thus, one current technical problem involves the ranking and selection of items and attributes for presentation within the limited space of an informational display.

In particular, in some example scenarios, an objective of an information retrieval service when selecting both the items as well their attributes for display can be to optimize relevance and utility to the user. This represents a challenging technical problem because in many domains there are thousands of items, each with dozens or more attributes.

To provide a particular example, an example search query might contain one or more medical symptoms, such as, for example "headache." An example search results page that is responsive to such query might provide an informational display that includes a list or ranking of items (e.g., medical conditions) that are associated with the symptom of headache. To further assist the user in understanding what medical conditions may be relevant to her, the informational display might also include attributes (e.g., other symptoms) associated with each medical condition. Thus, such example informational display requires both a selection of the medical conditions to include and also a selection of one or more other symptoms for each selected medical condition.

Certain existing techniques would resolve the above described problem in two separate stages. In particular, certain existing techniques would first rank the medical conditions and then, second, separately rank the symptoms for each medical condition. As a consequence of this two-stage solution, the overall quality of the informational display may suffer since there may be redundancies and/or a lack of coherence in the different symptoms across the list of medical conditions. Stated differently, such two-stage solution does not optimally consider relationships or dependencies between the attributes when selecting items or when selecting attributes within an item.

SUMMARY

Aspects and advantages of embodiments of the present disclosure will be set forth in part in the following description, or can be learned from the description, or can be learned through practice of the embodiments.

One example aspect of the present disclosure is directed to a computing system to select information for inclusion in informational displays. The computing system includes a machine-learned display selection model that has been trained to simultaneously and jointly select a plurality of items and one or more attributes for each item for inclusion in an informational display. The computing system includes one or more processors and one or more non-transitory computer-readable media that collectively store instructions that, when executed by the one or more processors, cause the computing system to perform operations. The instructions cause the computing system to obtain a plurality of candidate items that are candidates for inclusion in the informational display. A plurality of candidate attributes are associated with each of the plurality of candidate items. The instructions cause the computing system to determine a plurality of features for each of the plurality of candidate items or the candidate attributes for each candidate item. The instructions cause the computing system to input at least a portion of the plurality of features, the plurality of candidate items, and the plurality of candidate attributes for each item into the machine-learned display selection model. The instructions cause the computing system to receive, as an output of the machine-learned display selection model, a single joint selection that specifies both the plurality of items and the one or more attributes for each item for inclusion in the informational display.

Another example aspect of the present disclosure is directed to a computer-implemented method to select information for display. The method includes identifying, by the one or more computing devices, a plurality of candidate items for potential inclusion in an informational display. Each candidate item has a plurality of candidate attributes associated therewith. The method includes determining, by the one or more computing devices, one or more features for each of the plurality of candidate items and for each of the plurality of candidate attributes associated with each item. The method includes inputting, by the one or more computing devices, at least a portion of the plurality of candidate items, the plurality of candidate attributes, and their associated features into a machine-learned display selection model. The machine-learned display selection model is operable to optimize a nested submodular objective function to provide a display structure for use in an informational display. The method includes receiving, by the one or more computing devices, the display structure from the machine-learned display selection model. The display structure specifies a plurality of selected items selected from the plurality of candidate items. The display structure further specifies, for each selected item, one or more selected attributes selected from the plurality of candidate attributes associated with such selected item.

Another example aspect of the present disclosure is directed to one or more non-transitory computer-readable media that collectively store a machine-learned display selection model. The machine-learned display selection model is operable to optimize a nested submodular objective function to output a display structure that specifies both a plurality of items and one or more attributes for each item. The one or more non-transitory computer-readable media further collectively store instructions that, when executed by one or more processors, cause a computing system to perform operations. The instructions cause the computing system to obtain a plurality of candidate items that are responsive to a search query entered by a user. A plurality of candidate attributes are associated with each of the plurality of candidate items. The instructions cause the computing system to determine a plurality of features for each of the plurality of candidate items or the candidate attributes for each candidate item. The instructions cause the computing system to input at least a portion of the plurality of features, the plurality of candidate items, and the plurality of candidate attributes for each item into the machine-learned display selection model. The instructions cause the computing system to receive, as an output of the machine-learned display selection model, the display structure that specifies both the plurality of items and one or more attributes for each item for inclusion in a search results page.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Overview

Figure 1A:
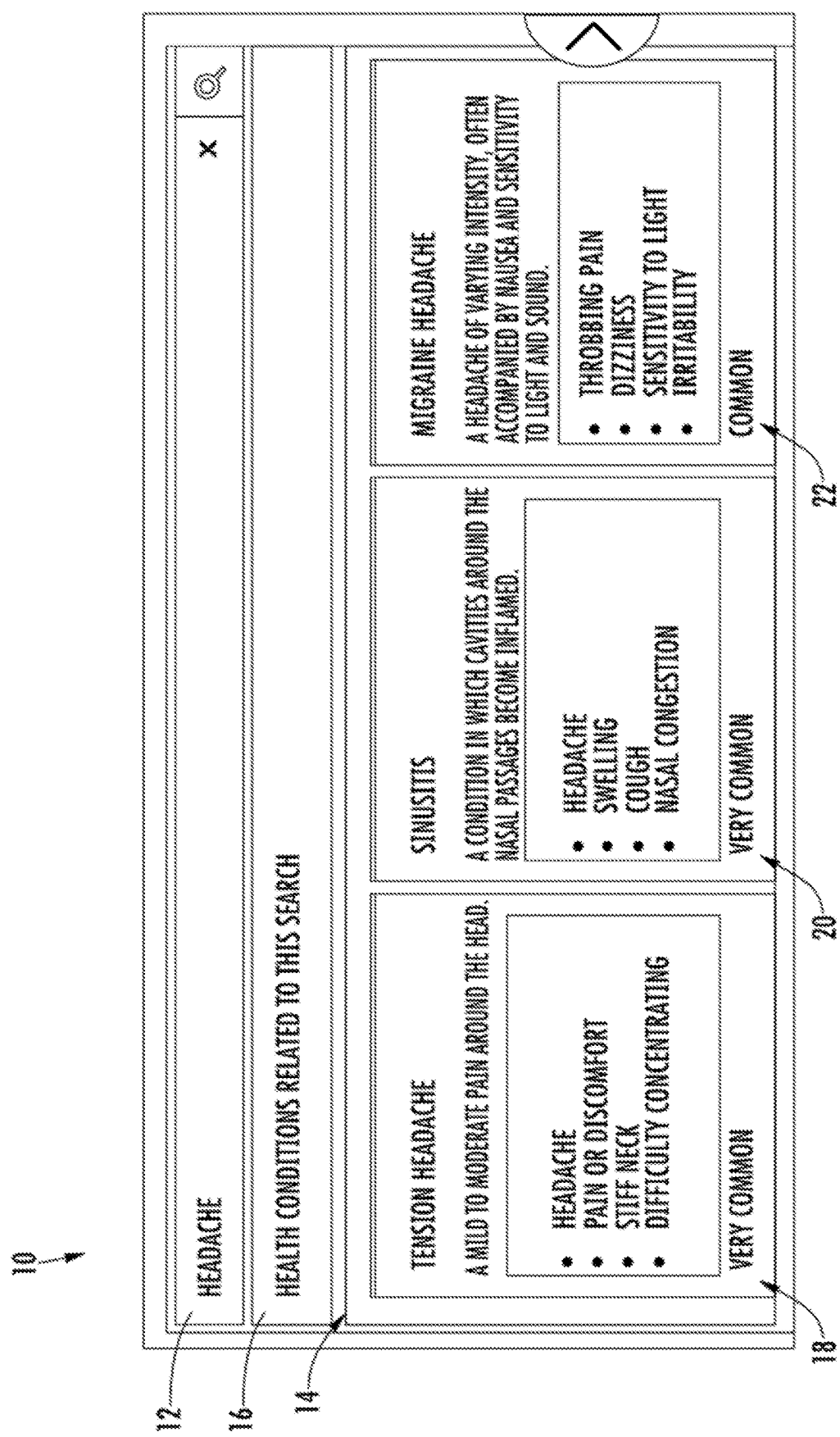
FIG. 1A depicts an example informational display according to example embodiments of the present disclosure.

Generally, the present disclosure is directed to systems and methods that use machine learning to improve whole-structure relevance of hierarchical informational displays. In particular, aspects of the present disclosure are directed to a supervised, discriminative machine learning approach to jointly optimize the ranking of items (e.g., entities or documents) and their display attributes. One example system includes a machine-learned display selection model that has been trained to jointly select a plurality of items and one or more attributes for each item for inclusion in an informational display. For example, the machine-learned display selection model can optimize a nested submodular objective function to jointly select the items and attributes.

More particularly, aspects of the present disclosure can be used to select information for inclusion in an informational display. In one particular example use case, a user can enter a search query on a user computing device and the search query can be transmitted to an information retrieval system implemented by one or more server computing devices. The information retrieval system can identify a plurality of candidate items that are responsive to the search query. The information retrieval system can implement the selection techniques described herein and can return the selected items and attributes in a display structure for presentation to the user on the user computing device. As other examples, a personal assistant application (e.g., an artificial intelligence based assistant) or a dashboard application implemented by the user computing device can identify and select information for inclusion within an informational display. Alternatively, the personal assistant application or dashboard application can communicate with one or more server computing devices to receive the selected information. In one example, the personal assistant or dashboard application retrieve and select the information based on one or more contextual cues (e.g., location, time, etc.), without having received an explicit search query from the user.

Thus, in response to receipt of a search query or other prompt or trigger (e.g., contextual cue), an information retrieval system can identify a plurality of items that are candidates for inclusion in an informational display. For example, the information retrieval system can operate a search engine or other search tools to identify items that are responsive to the search query or are otherwise candidates for inclusion in the display. As examples, items can include webpages, documents, images, files, entities (e.g., knowledge graph entities), recipes, reviews, events, news articles, points of interest, books, movies, or other items. Search engines or other tools can include a knowledge graph search tool, a shopping search tool, a search index, a map search tool, a news search tool, a video search tool, an image search tool, or other search engines or tools.

In addition, a plurality of attributes can be associated with each of the plurality of identified items. In some instances, attributes can be structured (e.g., structured annotations to documents). As one example, a search query that includes the string 'new smartphones' could return a number of items that correspond to different smartphone device models. The attributes associated with each particular smartphone device model could include the hardware specifications associated with that particular model, the performance specifications associated with that particular model, the price of that particular model, review data associated with that particular model, model availability, etc. In another example that will be described further below, items can correspond to medical conditions (e.g., particular illnesses or maladies) while the attributes for each medical condition correspond to symptoms associated with such medical condition. Thus, the information retrieval system can identify a large number of items and attributes that are responsive to the search query.

However, as described above in the Background section, an informational display typically has limited space for presenting information to the user. Therefore, providing an informational display requires the information retrieval system to make a selection and/or ranking of items and their associated attributes to determine which of the significant number of results identified by the search process are included in the informational display. In one example, an informational display can contain an interactive carousel of items (movies, medical conditions, etc.) and one or more associated attributes for each item.

As such, one objective of the information retrieval system is to both select the items to display as well as select their display attributes. Such selection can be based on various objectives including, for example, optimizing relevance and utility to the user. This is a challenging problem because in many domains there are thousands of items, each with dozens or more attributes. Thus, joint selection of both the items and their attributes is a challenging problem.

One example context for the systems and methods of the present disclosure is that of a 'symptom search'—where a search service returns a carousel of related medical conditions (and possibly other medical entities). To further help users understand what conditions may be relevant to them, the informational display can also include other symptoms associated with each displayed condition.

While this symptom search context is used as a running example throughout the present disclosure, the systems, methods, and techniques of the present disclosure are not limited to this example context but, instead, can be applied for any type of knowledge results or informational display. For example, the systems and methods of the present disclosure can be particularly beneficial for providing informational displays with knowledge graph entity results. These entities often contain hundreds or thousands of properties and, therefore, selecting which attributes to show for each item in the list is technically daunting.

In particular, the problem posed by symptom search and other analogous use cases is hierarchical: It requires selecting a "correct" group of items (and their order) to show as well as selecting the attributes (and their order) to optimize the relevance of the entire presentation. Current ranking approaches would solve these two problems—(1) ranking the items (e.g., conditions) and (2) ranking the attributes (e.g., symptoms) for each item—separately. As a consequence, the overall quality of the displayed ranking will suffer since there can be redundancies or a lack of coherence in the different attributes across the list of items. For example, if a desired objective of the informational display is to provide coherent description of symptoms across different conditions, then separate selection of items and attributes as described for certain current ranking approaches would not properly meet this objective, as dependencies between attributes across different items would not be modeled or otherwise considered.

By contrast, the systems and methods described herein take a 'global' view even while solving local sub-problems at the lowest level. Use of such a global view allows the systems and methods of the present disclosure to model and capture dependencies across items and attributes at different levels of the hierarchy. The algorithms described herein that enable such global view are simple and computationally efficient while also theoretically guaranteeing a solution that is within a constant factor of the optimal.

Thus, the systems and methods of the present disclosure can overcome the limitations associated with current separate ranking techniques by treating the overall problem as one giant structured prediction problem. In other words, instead of learning to predict each of the local substructures separately, the systems and methods of the present disclosure can use structured learning techniques that are trained to predict the entire ranking structure at once. This global view enables the systems and methods described herein to model dependencies across aspect lists of different items and can also enable the systems and methods to minimize redundancy or maximize coherence of these nested lists, as the particular situation requires.

In particular, in some implementations of the present disclosure, the information retrieval system can include a machine-learned display selection model. The machine-learned display selection model can be trained to jointly select a plurality of items and one or more attributes for each item for inclusion in an informational display. Thus, the display selection model can perform structured prediction according to the global view described above to simultaneously solve the entire item and attribute selection problem, rather than predicting relevance of a particular item and/or attribute in a binary fashion or separately ranking the items and the attributes.

In some implementations, the machine-learned display selection model can include one or more structured support vector machines. In some implementations, the machine-learned display selection model can include one or more determinative point processes; factor graphs; or other machine-learned models, including various graphical models. In some implementations, the machine-learned display selection model can include one or more structured deep neural networks.

According to another aspect of the present disclosure, in some implementations, the above-described structured prediction approach can be enabled through use of a suitable objective function that captures all the rich dependencies while still being tractable to optimize. As an example, in some implementations, the systems and methods of the present disclosure can use a nested submodular objective function that models the dependencies (relatedness, redundancy, etc.) between the items and/or attributes at different levels of the hierarchy. For example, one or more weights and/or parameters of the nested submodular objective function can be machine-learned or adjusted using machine-learned techniques.

Thus, in some implementations, a nested submodular objective function can include one or more submodular functions that model dependencies at a particular level of the hierarchy. As one example, a respective submodular function for each item can encourage diversity or coherence within the attribute lists of such item. As another example, other submodular functions can model dependencies between attributes across two or more items. As yet another example, these submodular functions can be nested inside an overall submodular function that encourages diversity or coherence between the items.

One advantage of this formulation is that the systems and methods of the present disclosure can employ computationally efficient algorithms to optimize these complex objectives. For example, the machine-learned display selection model can implement one or more optimization algorithms to optimize the nested submodular objective function, thereby producing a display structure that specifies (e.g., ranks) the selected items and their respective selected attributes. Additionally, these optimization algorithms come with strong theoretical guarantees that ensure a quality of solution within a constant factor of the optimal.

One example algorithm employed in some implementations of the present disclosure is the nested greedy algorithm. For example, the machine-learned display selection model can implement the nested greedy algorithm to greedily select items (e.g., in a pre-order depth-first search manner) based on all the dependencies with all previously selected items. Combining these computationally efficient algorithms together in the structured prediction framework can guarantee convergence in a polynomial number of iterations.

According to another aspect of the present disclosure, each item and item attribute has features that can be provided to the machine-learned display selection model. In particular, the information retrieval system can extract a number of features for each item and/or attribute. These features can be any class of feature used in learning to rank models. As examples, features that can be extracted or otherwise obtained by the information retrieval system can include importance features (e.g., popularity, authority, PageRank); similarity features (e.g., shared keywords, shared mentions of items/attributes, character overlap, word overlap, shared specifications or parameters); features generated through an embedding algorithm; and/or other types of features. For example, for attributes, features can be descriptive of the frequency of the attribute in the collection.

As one example feature, in the context of information provided in knowledge panels, a key quality is understandability by users—users find attributes with everyday language more useful than technical jargon—and this understandability can be modeled and used as a feature. Another example feature can also be descriptive of manual human judgments of what items are relevant or what properties of those items are the most important.

Features that model item and attribute similarity can be used to model the dependencies between attributes within a single item as well as across items. These can be measures such as, for example, string similarity, topical similarity, or other model.

According to another aspect, neural embedding models of attributes can be used to model similarity in an embedding space. In one example, the neural embedding models can have around fifty dimensions. Neural embedding models can be used for items and/or attributes.

Additional example features include features that model technicality (e.g., the less technical 'headache vs the more technical 'cephalgia'); information content (e.g., 'not available' or empty attribute values); redundancy (e.g., string or entity overlap); generality (e.g., the more general 'pain' vs. the more specific 'lower left stomach pain'); length and quality of descriptions; and strength of association in the knowledge graph.

Use of the above described feature types enable the systems and methods of the present disclosure to model diversity and similarity across items and/or attributes. In particular, the particular objectives for information selection can vary from application to application. For example, in certain scenarios an objective for the informational display might be to have coherent attributes across items (e.g., shared film genre or actor); while in a different scenario an objective for the informational display might be to exhibit diversity across items and/or attributes. The specific objective (e.g., diversity vs. coherence) will vary from vertical to vertical and for different types of informational displays. As such, extraction and use of features that model dependencies between attributes within a single item as well as across items enables the systems and methods of the present disclosure to flexibly minimize redundancy or to maximize coherence, as the particular scenario dictates.

According to another aspect, in some implementations, the machine-learned display selection model can be trained based at least in part on a set of training data. In some implementations, training the machine-learned display selection model can include adjusting one or more weights and/or parameters included in a nested submodular objective function that the machine-learned display selection model is configured to optimize.

As an example, the set of training data can include pairs of 1) example items/attributes with corresponding example features and 2) preferred display structures (e.g., preferred carousels) that include a subset of the example items/attributes. For example, in some implementations, the preferred display structures can be generated based on collected manual judgments of what types and arrangements of items and attributes are most useful in response to a given query or other types of human feedback.

In particular, in some implementations, the machine-learned display selection model can be trained based on a loss function that compares a particular one of the preferred display structure to a predicted display structure that was predicted by the display selection model based on the input example items/attributes with example features that correspond within the training data to the particular preferred display structure. For example, the loss function can describe differences in feature vectors between the preferred display structure and the predicted display structure. In some implementations, the loss function can be factorized and/or decomposable. As examples, the loss function can include a measure of a number of overlapping slots between the preferred display structure and the predicted display structure and/or a number of correct pairs provided by the predicted display structure relative to the preferred display structure.

In another example, the machine-learned display selection model can be trained using a preferential feedback technique where given a query (or other context) and two hierarchical informational displays, the label is the preference between the two displays (e.g., display one is better than display two). In some implementations, such label can be provided through manual feedback or selection between the two displays.

Thus, the present disclosure provides systems and methods that use machine learning to improve whole-structure relevance of hierarchical informational displays. In particular, the present disclosure provides systems and methods that employ a supervised, discriminative machine learning approach (e.g., a machine-learned display selection model) to jointly optimize the ranking of items and their display attributes.

With reference now to the Figures, example embodiments of the present disclosure will be discussed in further detail.

Example Informational Displays

FIG. 1A depicts an example informational display 14 according to example embodiments of the present disclosure. In particular, the informational display 14 is an example carousel that be used in the symptom search context described above.

The example informational display 14 is illustrated as included in a search results page 10. The search results page 10 is provided in response to a search query 12 that includes a medical symptom. The informational display 14 includes information relevant to the search query 12.

In particular, the informational display 14 is illustrated as including three cards 18, 20, and 22. Additional cards may be available if the user selects the arrow on the right side of the carousel. The informational display 14 can include a heading 16.

Each card 18, 20, and 22 corresponds to an item. For the example display 14, each item is a medical condition associated with the symptom in the search query 12. For example, card 18 corresponds to the item "tension headache," while the card 20 corresponds to the item "sinusitis," and the card 22 corresponds to the item "migraine headache."

Each card 18, 20, and 22 further includes attributes associated with the respective item. In particular, for the example display 14, each card 18, 20, and 22 further includes additional symptoms associated with the respective medical condition item. For example, the card 18 for the item of tension headache includes the following attributes: headache; pain or discomfort; stiff neck; difficulty concentrating. Additional information can be included, such as, for example, a description of the medical condition (e.g., "a mild to moderate pain around the head") and/or an indication of the frequency of the medical condition (e.g., "very common"). In some implementations, this additional information is a selectable attribute. In other implementations, the additional information is fixed and only the additional symptoms included within the card are selectable attributes.

According to aspects of the present disclosure, both the items and the attributes included in cards 18, 20, and 22 can be jointly selected to optimize the whole-structure relevance of the informational display 14. For example, a machine-learned display selection model can predict a single display structure that specifies the structure of and information included in each of cards 18, 20, and 22.

The informational display 14 is provided as one example only. Many different informational displays can be used in many different contexts.

Figure 1B:
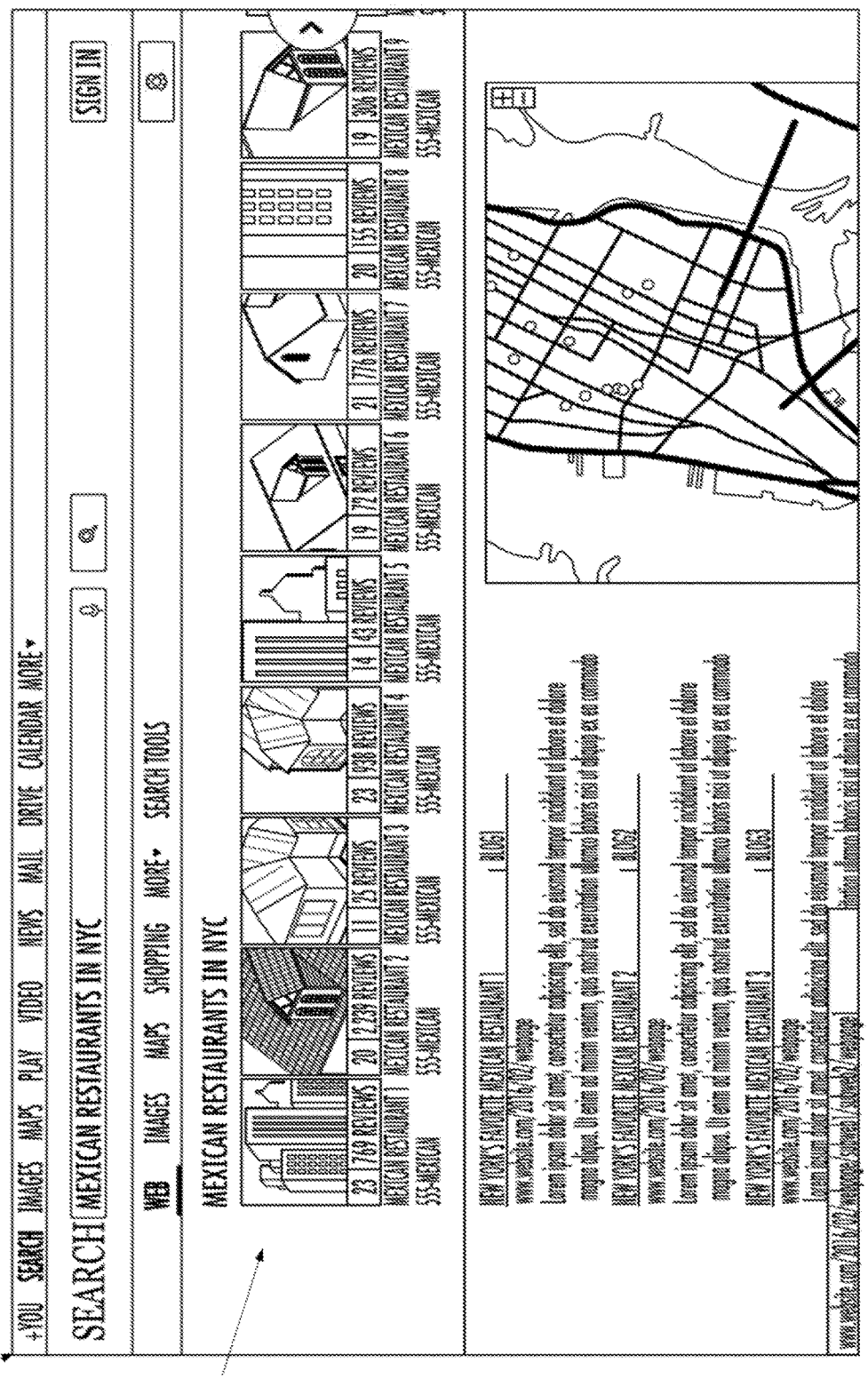
FIG. 1B depicts an example informational display according to example embodiments of the present disclosure.

As another example, FIG. 1B depicts an example informational display 50 according to example embodiments of the present disclosure. The informational display 50 is included in a search results page 52 that is provided in response to a search query.

The informational display 50 identifies a number of items (e.g., points of interest such as restaurants) in an interactive carousel. For each item, the informational display includes a number of attributes (e.g., review score; number of reviews; names; phone number; etc.). Both the items and the attributes included in the informational display 50 can be jointly selected (e.g., by a machine-learned display selection model) to optimize whole-structure relevance of the informational display 50.

As further example use cases, a personal assistant application (e.g., an artificial intelligence based assistant) or a dashboard application implemented by a user computing device can identify and select information for inclusion within an informational display. Alternatively, the personal assistant application or dashboard application can communicate with one or more server computing devices to receive the selected information. The informational display can be presented to a user on a display of the user computing device.

In one example, the personal assistant or dashboard application retrieve and select the information based on one or more contextual cues (e.g., location, time, etc.), without having received an explicit search query from the user.

Example Devices and Systems

Figure 2:
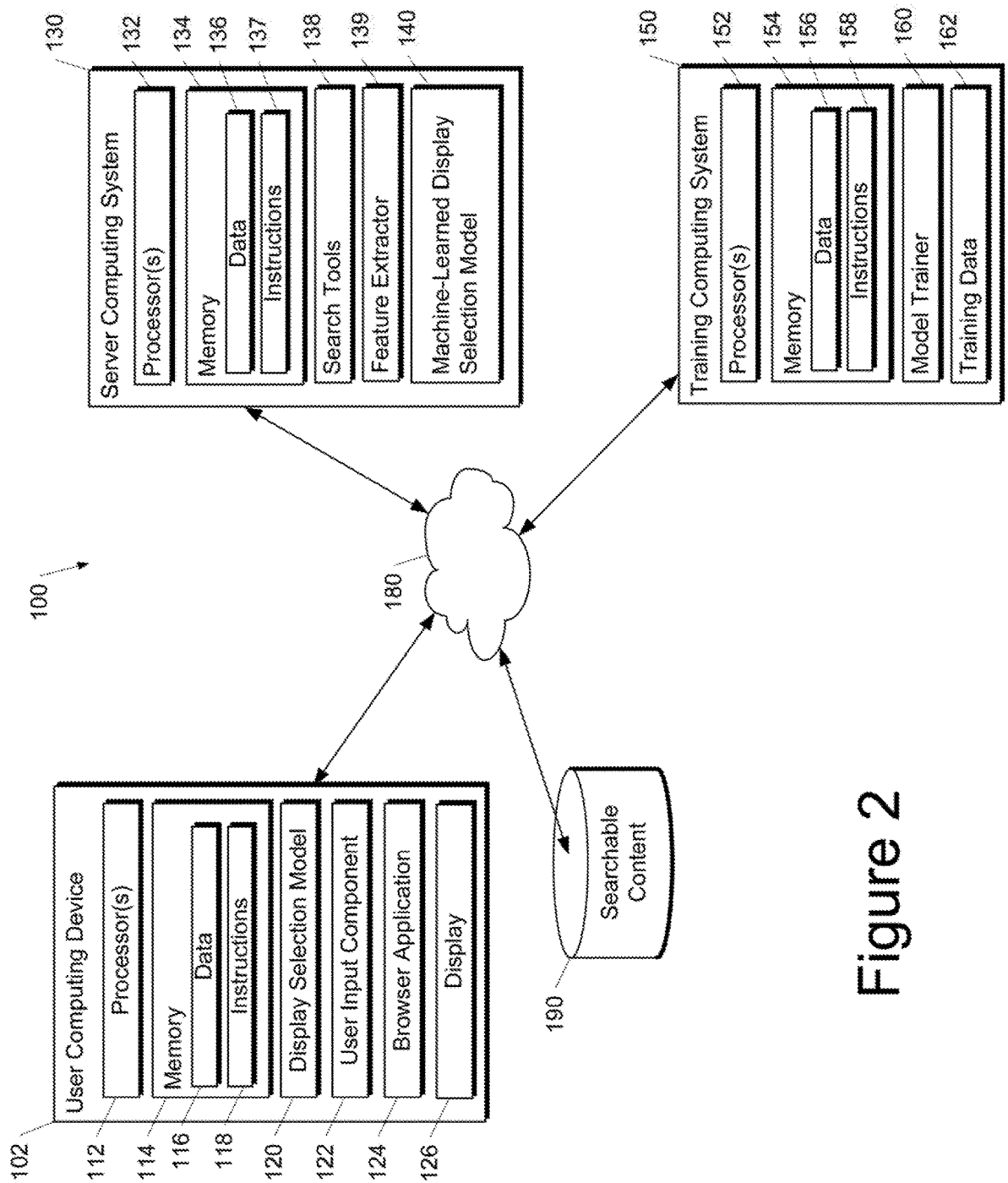
FIG. 2 depicts a block diagram of an example computing system to select information for display according to example embodiments of the present disclosure.

FIG. 2 depicts a block diagram of an example computing system 100 that selects information for inclusion in an informational display according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

The user computing device 102 can store or include one or more display selection models 120. For example, the display selection models 120 can be or can otherwise include various machine-learned models such as neural networks (e.g., deep neural networks) or other multi-layer non-linear models. Neural networks can include structured neural networks, recurrent neural networks (e.g., long short-term memory recurrent neural networks), convolutional neural networks, feed-forward neural networks, or other forms of neural networks. In other implementations, the display selection models 120 can be or can otherwise include one or more structured support vector machines; determinative point processes; factor graphs; and/or other machine-learned models, including various graphical models. In other implementations, the user computing device 102 does not store or include the one or more models 120.

In some implementations, the one or more display selection models 120 can be received from the server computing system 130 over network 180, stored in the user computing device memory 114, and the used or otherwise implemented by the one or more processors 112. In some implementations, the user computing device 102 can implement multiple parallel instances of a single display selection model 120 (e.g., to perform parallel selection of information for display across multiple informational displays).

In some implementations, each display selection model 120 is trained to jointly select a plurality of items and one or more attributes for each item for inclusion in an informational display. For example, the machine-learned display selection model 120 can optimize a nested submodular objective function to jointly select the items and attributes.

Additionally or alternatively, one or more display selection models 140 can be included in or otherwise stored and implemented by the server computing system 130 that communicates with the user computing device 102 according to a client-server relationship. For example, the display selection models 140 can be implemented by the server computing system 140 as a portion of a web service (e.g., a search or information retrieval service). Thus, one or more models 120 can be stored and implemented at the user computing device 102 and/or one or more models 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can enter a communication (e.g., a search query).

In some implementations, the user computing device 102 includes a browser application 124. The browser application 124 can be implemented by the one or more processors 112. The browser application 124 can retrieve, present, and traverse information resources from the World Wide Web. The browser application 124 can be a mobile web browser. In one example, the browser application 124 can communication with the server computing system 130 over network 180 to receive a search results page that includes an informational display.

In some implementations, the user computing device 102 includes a display 126. The display 126 can include different types of display components, such as, for example, a light-emitting diode display (e.g., organic light-emitting diode display), a liquid-crystal display (e.g., thin-film-transistor liquid-crystal display), a thin-film diode display, etc. In some implementations, the display 126 can also be touch-sensitive. For example, the display can be a capacitive touchscreen, a resistive touchscreen, or other touch-sensitive technologies.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

The server computing system 130 can include one or more search tools 138. Search tools 138 can include a knowledge graph search tool, a shopping search tool, a search index, a map search tool, a news search tool, a video search tool, an image search tool, or other search engines or tools. In some implementations, the search tools 138 can be included in the user computing device 102. The search tools 138 can locate or otherwise retrieve information (e.g., items and attributes) that is relevant to a query or other request for information.

In particular, as an example, the search tools 138 can enable or perform extraction of information such as items and attributes from one or more databases or other data sources of searchable content 190. In some implementations, the database(s) of searchable content 190 can store content that can be inserted into an informational display. For example, the content can be discrete units of content and can be in the form of text, images, videos, graphics, audio, tables, or other types of content. In some implementations, the database(s) of searchable content 190 can include an index of items and data identifying content relevant to the items. For example, the index can include data identifying a title for an item, one or more images relevant to the item, a description of the item, one or more facts about the item, one or more videos relevant to the item, upcoming events related to the item, content from a social networking page associated with the item, and other information or types or categories of content that have been deemed relevant to the item. In some implementations, the searchable content 190 can include one or more knowledge graphs.

In some implementations, the content 190 for each item can come from disparate sources and/or disparate publishers. For example, content for a particular item can be obtained from several different web pages or other resources that are each hosted by different publishers. To illustrate, the content for a particular actor may include images of the actor received from several different sources and these images can be included in an informational display that is provided in response to a query that references the particular actor. As another example, an image of a person may be obtained from an official site for the person, and a set of facts and/or description for the person may be obtained from an online encyclopedia. In some implementations, the search tools 138 identify content for each item by crawling the Internet for content related to the item.

The server computing system 139 can include one or more feature extractors 139. The one or more feature extractors 139 can extract a number of features for one or more items and/or attributes. These features can be any class of feature used in learning to rank models. As examples, features that can be extracted or otherwise obtained by the feature extractors 139 can include importance features (e.g., popularity, authority, PageRank); similarity features (e.g., shared keywords, shared mentions of items/attributes, character overlap, word overlap, shared specifications or parameters); features generated through an embedding algorithm; and/or other types of features. In some implementations, a search tool 138 and a feature extractor 139 can be combined as a single component.

As another example, in some implementations, the features extracted for an item and/or attribute can include a neural embedding feature. Thus, in such implementations, a feature extractor 139 can include a neural network (e.g., a deep neural network) that produces an embedding (e.g., at a hidden layer of the network). In some implementations, embeddings for items and/or attributes can themselves be used as features. In other implementations, differences between pairs of embeddings respectively for a pair of items or pair of attributes can be used as features. For example, differences between embeddings for a pair of items or attributes can be used as a similarly feature to indicate a similarly between the pair of items or attributes.

In some implementations, the search tools 138 and/or feature extractors 139 each include computer logic utilized to provide desired functionality. Each of the search tools 138 and/or feature extractors 139 can be implemented in hardware, firmware, and/or software controlling a general purpose processor. For example, in some implementations, each of the search tools 138 and/or feature extractors 139 includes program files stored on a storage device, loaded into a memory and executed by one or more processors. In other implementations, each of the search tools 138 and/or feature extractors 139 includes one or more sets of computer-executable instructions that are stored in a tangible computer-readable storage medium such as RAM hard disk or optical or magnetic media.

As described above, the server computing system 130 can store or otherwise includes one or more machine-learned display selection models 140. For example, the display selection models 140 can be or can otherwise include various machine-learned models such as neural networks (e.g., deep recurrent neural networks) or other multi-layer non-linear models. In other implementations, the display selection models 120 can be or can otherwise include one or more structured support vector machines; determinative point processes; factor graphs; and/or other machine-learned models, including various graphical models.

In some implementations, each display selection model 120 is trained to jointly select a plurality of items and one or more attributes for each item for inclusion in an informational display. For example, the machine-learned display selection model 120 can optimize a nested submodular objective function to jointly select the items and attributes.

The server computing system 130 can train each display selection model 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 140 stored at the server computing system 130 using various training or learning techniques, such as, for example, backwards propagation of errors. In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train a display selection model 140 based on a set of training data 162. In some implementations, training the machine-learned display selection model can include adjusting one or more weights and/or parameters included in a nested submodular objective function that the machine-learned display selection model is configured to optimize.

In some implementations, the training data 162 can include, for example, pairs of 1) example items/attributes with corresponding example features and 2) preferred display structures (e.g., preferred carousels) that include a subset of the example items/attributes. For example, in some implementations, the preferred display structures can be generated based on collected manual judgments of what types and arrangements of items and attributes are most useful in response to a given query or other types of human feedback.

In particular, in some implementations, the machine-learned display selection model 120 or 140 can be trained based on a loss function that compares a particular one of the preferred display structure to a predicted display structure that was predicted by the display selection model based on the input example items/attributes with example features that correspond within the training data 162 to the particular preferred display structure. For example, the loss function can describe differences in feature vectors between the preferred display structure and the predicted display structure. In some implementations, the loss function can be factorized and/or decomposable. As examples, the loss function can include a measure of a number of overlapping slots between the preferred display structure and the predicted display structure and/or a number of correct pairs provided by the predicted display structure relative to the preferred display structure.

In some implementations, if the user has provided consent, the training examples can be provided by the user computing device 102 (e.g., based on information selections previously performed by the user of the user computing device 102). Thus, in such implementations, the model 120 provided to the user computing device 102 can be trained by the training computing system 150 on user-specific information selection data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 2 illustrates one example computing system that can be used to implement the present disclosure. Other computing systems can be used as well. For example, in some implementations, the user computing device 102 can include the model trainer 160 and the training dataset 162. In such implementations, the display selection models 120 can be both trained and used locally at the user computing device 102. In some of such implementations, the user computing device 102 can implement the model trainer 160 to personalize the display selection models 120 based on user-specific data.

In some example systems, the models 120/140 can be included in an application of the computing device. In other example systems, the models 120/140 can be included in an operating system of the computing device and can interface with applications via an application programming interface.

Figure 3:
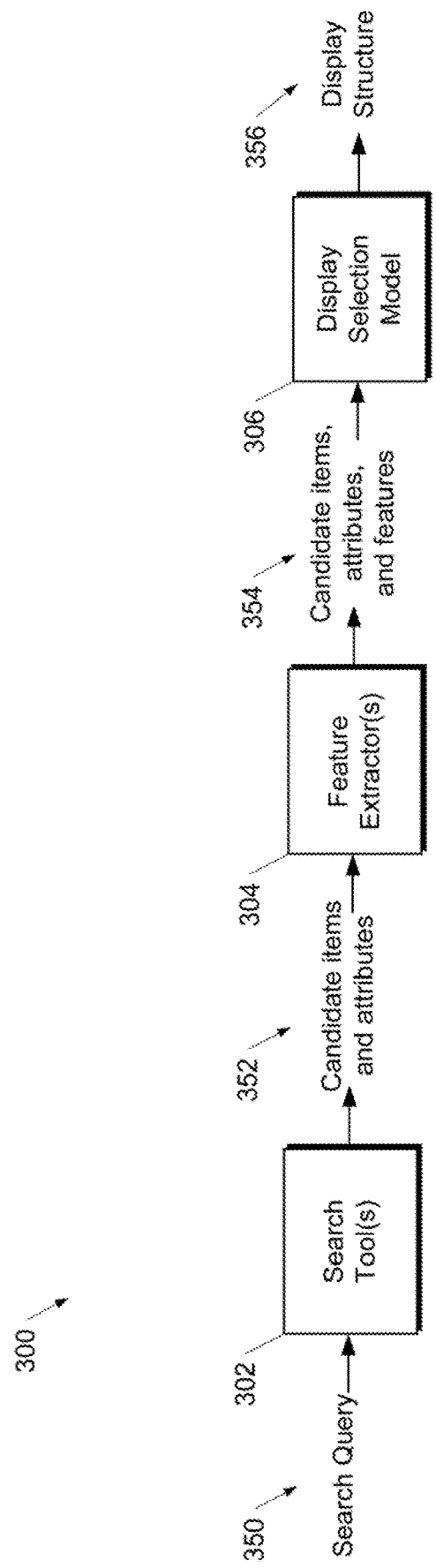
FIG. 3 depicts a block diagram of an example processing pipeline to select information for display according to example embodiments of the present disclosure.

FIG. 3 depicts a block diagram of an example processing pipeline 300 to select information for display according to example embodiments of the present disclosure. The example processing pipeline includes one or more search tools 302, one or more feature extractors 304, and a display selection model 306.

In one example use of the processing pipeline 300, the search tools 302 can receive a search query 350 or other prompt or trigger than indicates a desire for certain information. In response to the search query 350 or other prompt, the search tools 302 can return a plurality of candidate items and candidate attributes 352.

Thus, in response to receipt of a search query 350 or other prompt or trigger (e.g., contextual cue), the search tools 302 can identify a plurality of items 352 that are candidates for inclusion in an informational display. As examples, items can include webpages, documents, images, files, entities (e.g., knowledge graph entities), recipes, reviews, events, news articles, points of interest, books, movies, or other items. Search engines or other search tools 302 can include a knowledge graph search tool, a shopping search tool, a search index, a map search tool, a news search tool, a video search tool, an image search tool, or other search engines or tools.

The one or more feature extractors 304 can extract a number of features 354 for each item and/or attribute. These features can be any class of feature used in learning to rank models. As examples, features 354 that can be extracted by the feature extractors 304 can include importance features (e.g., popularity, authority, PageRank); similarity features (e.g., shared keywords, shared mentions of items/attributes, character overlap, word overlap, shared specifications or parameters); features generated through an embedding algorithm; and/or other types of features. For example, for attributes, features 354 can be descriptive of the frequency of the attribute in the collection.

As one example feature 354, in the context of information provided in knowledge panels, a key quality is understandability by users—users find attributes with everyday language more useful than technical jargon—and this understandability can be modeled and used as a feature. Another example feature 354 can include manual human judgments of what items are relevant or what properties of those items are the most important.

Features 354 that model item and attribute similarity can be used to model the dependencies between attributes within a single item as well as across items. These can be measures such as, for example, string similarity, topical similarity, or other model.

As another example feature 354, a neural network model can be used to provide an embedding feature for an item and/or attribute. In some instances, a neural embedding feature can model similarity of items or attributes in an embedding space. In one example, the neural embedding models can have around fifty dimensions. Neural embedding models can be used for items and/or attributes.

Additional example features 354 include features that model technicality (e.g., the less technical 'headache' vs the more technical 'cephalgia'); information content (e.g., 'not available' or empty attribute values); redundancy (e.g., string or entity overlap); generality (e.g., the more general 'pain' vs. the more specific 'lower left stomach pain'); length and quality of descriptions; and strength of association in the knowledge graph.

Use of the above described feature types enables modeling of diversity and similarity across items and/or attributes. In particular, the particular objectives for information selection can vary from application to application. For example, in certain scenarios an objective for the informational display might be to have coherent attributes across items (e.g., shared film genre or actor); while in a different scenario an objective for the informational display might be to exhibit diversity across items and/or attributes. The specific objective (e.g., diversity vs. coherence) will vary from vertical to vertical and for different types of informational displays. As such, extraction and use of features 354 that model dependencies between attributes within a single item as well as across items enables the systems and methods of the present disclosure to flexibly minimize redundancy or to maximize coherence, as the particular scenario dictates.

At least some portion of the candidate items, candidate attributes, and features 354 can be input in the display selection model 306. The display selection model 306 can be trained to jointly select a plurality of items and one or more attributes for each item for inclusion in the informational display. In particular, the display selection model 306 can output a display structure 356 that specifies (and in some instances ranks) both the plurality of items and one or more attributes for each item for inclusion in the informational display.

Thus, the display selection model 306 can perform structured prediction according to a global view to simultaneously solve the entire item and attribute selection problem, rather than predicting relevance of a particular item and/or attribute in a binary fashion or separately ranking the items and the attributes.

In other words, instead of learning to predict each of the local substructures separately, the systems and methods of the present disclosure can use structured learning techniques that are trained to predict the entire ranking structure 356 at once. This global view enables the systems and methods described herein to model dependencies across aspect lists of different items and can also enable the systems and methods to minimize redundancy or maximize coherence of these nested lists, as the particular situation requires.

Example Methods

Figure 4:
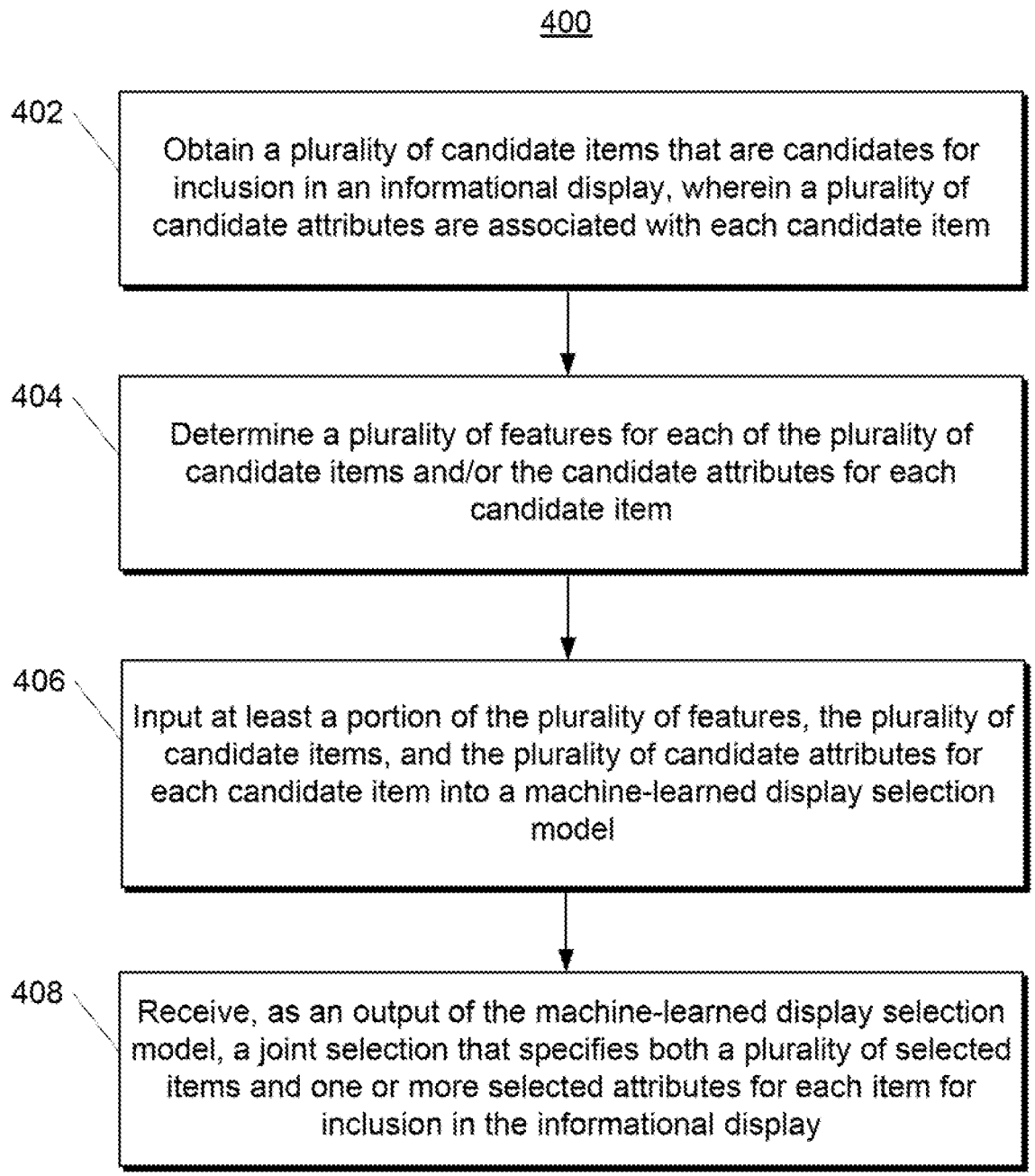
FIG. 4 depicts a flowchart diagram of an example method to select information for display according to example embodiments of the present disclosure.

FIG. 4 depicts a flowchart diagram of an example method 400 to select information for display according to example embodiments of the present disclosure.

Although FIG. 4 depicts steps performed in a particular order for purposes of illustration and discussion, the methods of the present disclosure are not limited to the particularly illustrated order or arrangement. The various steps of the method 400 can be omitted, rearranged, combined, and/or adapted in various ways without deviating from the scope of the present disclosure.

At 402, a computing system obtains a plurality of candidate items that are candidates for inclusion in an informational display. A plurality of candidate attributes are associated with each candidate item. For example, the candidate items and attributes can be obtained from or using different search engines or tools.

In some implementations, the search tools can provide a base ranking of the candidate items and/or attributes. In some implementations, the initial set of candidate items and/or attributes can be culled according to the base ranking. For example, the initial set of candidate items and/or attributes can be reduced from about 10,000 items and/or attributes to about 50 items and/or attributes. In some implementations, such culling process according to the base ranking does not occur until after step 404.

At 404, the computing system determines a plurality of features for each of the plurality of candidate items and/or the candidate attributes for each candidate item. For example, features can be extracted as described above in accordance with feature extractors 139 and/or 304.

In some implementations, at least one of the plurality of features for at least one of the plurality of candidate items is a similarity feature that is descriptive of a degree of similarity between such candidate item and at least one other candidate item. Additionally or alternatively, the similarity features can be descriptive of a degree of similarity between one of the candidate attributes associated with such candidate item and one of the candidate attributes associated with at least one other candidate item.

In some implementations, to determine one of the plurality of features at 404, the computing system can determine a first neural network embedding for a first candidate item or a first candidate attribute of the first candidate item. The first embedding can serve as a feature for the first candidate item or the first candidate attribute of the first candidate item.

In some implementations, the computing system can further determine a second neural network embedding for a second candidate item or a second candidate attribute of the second candidate item. The computing system can further determine a difference between the first neural network embedding and the second neural network embedding. The difference can serve as one of the features for one or more of the first candidate item, the first candidate attribute, the second candidate item, and the second candidate attribute.

At 406, the computing system inputs at least a portion of the plurality of features, the plurality of candidate items, and the plurality of candidate attributes for each candidate item in a machine-learned display selection model.

In some implementations, the machine-learned display selection model is operable to optimize a nested submodular objective function to jointly select the plurality of items and the one or more attributes for each item. In some implementations, the nested submodular objective function models one or more first dependencies between the plurality of selected items and also models one or more second dependencies between the selected attributes for two or more of the plurality of selected items. In some implementations, the machine-learned display selection model implements a nested greedy algorithm to optimize the objective function.

At 408, the computing system receives, as an output of the machine-learned display selection model, a joint selection that specifies both a plurality of selected items and one or more selected attributes for each item for inclusion in the informational display. For example, at 408, the computing system can receive a display structure that specifies both the plurality of selected items and one or more selected attributes for each item for inclusion in the informational display In some implementations, the joint selection further specifies both an item ordering for the plurality of items and an attribute ordering for the one or more attributes for each item. In some implementations, the informational display is a carousel that exhibits the display structure (e.g., has the items ordered according to the item ordering).

In some implementations, method 400 further includes providing the informational display for display to a user. As examples, the informational display can be included in a search results page, knowledge panel, or other display.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system to select information for inclusion in informational displays, the computing system comprising:
   a machine-learned display selection model that has been trained to simultaneously and jointly select a plurality of items and one or more attributes for each item for inclusion in an informational display;
   one or more processors; and
   one or more non-transitory computer-readable media that collectively store instructions that, when executed by the one or more processors, cause the computing system to:
      obtain a plurality of candidate items that are candidates for inclusion in the informational display, wherein a plurality of candidate attributes are associated with each of the plurality of candidate items;
      determine a plurality of features for each of the plurality of candidate items or the candidate attributes for each candidate item;
      input at least a portion of the plurality of features, the plurality of candidate items, and the plurality of candidate attributes for each item into the machine-learned display selection model, wherein the machine-learned display selection model is operable to optimize a nested submodular objective function to simultaneously and jointly select the plurality of items and the one or more attributes for each item; and
      receive, as an output of the machine-learned display selection model, a single joint selection that specifies both the plurality of items and the one or more attributes for each item for inclusion in the informational display.

2. The computing system of claim 1, wherein at least one of the plurality of features for at least one of the plurality of candidate items comprises a similarity feature that is descriptive of a degree of similarity between such candidate item and at least one other candidate item.

3. The computing system of claim 1, wherein at least one of the plurality of features for at least one of the plurality of candidate items comprises a similarity feature that is descriptive of a degree of similarity between one of the candidate attributes associated with such candidate item and one of the candidate attributes associated with at least one other candidate item.

4. The computing system of claim 1, wherein to determine at least one of the plurality of features for at least one of the plurality of candidate items, the computing system:
  determines a first neural network embedding for a first candidate item or a first candidate attribute of the first candidate item;
  determines a second neural network embedding for a second candidate e or a second candidate attribute of the second candidate item; and
  determines a difference between the first neural network embedding and the second neural network embedding, wherein the difference serves as one of the features for one or more of the first candidate item, the first candidate attribute, the second candidate item, and the second candidate attribute.

5. The computing system of claim 1, wherein the machine-learned display selection model comprises one or more structured support vector machines.

6. The computing system of claim 1, wherein the machine-learned display selection model implements a nested greedy algorithm to optimize an objective function.

7. The computing system of claim 1, wherein the plurality of items comprise a plurality of medical conditions that are responsive to a search query entered by a user, wherein the one or more attributes for each item comprise one or more symptoms for each medical condition, and wherein the informational display is included in a search results page.

8. The computing system of claim 1, wherein the single joint selection further specifies both an item ordering for the plurality of items and an attribute ordering for the one or more attributes for each item.

9. A computer-implemented method to select information for display, the method comprising:
  identifying, by one or more computing devices, a plurality of candidate items for potential inclusion in an informational display, wherein each candidate item has a plurality of candidate attributes associated therewith;
  determining, by the one or more computing devices, one or more features for each of the plurality of candidate items and for each of the plurality of candidate attributes associated with each item;
  inputting, by the one or more computing devices, at least a portion of the plurality of candidate items, the plurality of candidate attributes, and their associated features into a machine-learned display selection model, wherein the machine-learned display selection model is operable to optimize a nested submodular objective function to provide a display structure for use in the informational display, wherein optimizing the nested submodular objective function to provide the display structure comprises simultaneously and jointly selecting a plurality of items from the plurality of candidate items and one or more selected attributes from the plurality of candidate attributes associated with such selected items for inclusion in the display structure; and
  receiving, by the one or more computing devices, the display structure from the machine-learned display selection model, wherein the display structure specifies the plurality of selected items and, for each selected item, the one or more selected attributes.

10. The computer-implemented method of claim 9, wherein the nested submodular objective function models one or more first dependencies between the plurality of selected items and also models one or more second dependencies between the selected attributes for two or more of the plurality of selected items.

11. The computer-implemented method of claim 9, wherein the machine-learned display selection model comprises a machine-learned structured support vector machine.

12. The computer-implemented method of claim 9, wherein the machine-learned display selection model implements a nested greedy algorithm to optimize the nested submodular objective function.

13. The computer-implemented method of claim 9, wherein the display structure ranks the plurality of selected items, and wherein the display structure further ranks the one or more selected attributes for each selected item.

14. The computer-implemented method of claim 9, further comprising:
  prior to said inputting, training, by the one or more computing devices, the machine-learned display selection model based at least in part on one or more preferred display structures that were manually created based on human feedback, wherein training, by the one or more computing devices, the machine-learned display selection model comprises updating, by the one or more computing devices, one or more weights or parameters included in the nested submodular objective function.

15. The computer-implemented method of claim 14, wherein training, by the one or more computing devices, the machine-learned display selection model based at least in part on the one or more preferred display structures comprises training, by the one or more computing devices, the machine-learned display selection model based at least in part on a loss function that describes a number of slots correctly filled by a predicted display structure relative to one of the preferred display structures.

16. The computer-implemented method of claim 9, further comprising:
  providing, by the one or more computing devices, the informational display for display to a user, wherein the informational display comprises a carousel that has the display structure output by the machine-learned display selection model.

17. One or more non-transitory computer-readable media that collectively store:
  a machine-learned display selection model that is operable to optimize a nested submodular objective function to:
    simultaneously and jointly select, for a display structure, a plurality of items and one or more attributes for each item of the plurality of items; and
    output the display structure that specifies both the plurality of items and the one or more attributes for each item;
  instructions that, when executed by one or more processors, cause a computing system to:
    obtain a plurality of candidate items that are responsive to a search query entered by a user, wherein a plurality of candidate attributes are associated with each of the plurality of candidate items;
    determine a plurality of features for each of the plurality of candidate items or the candidate attributes for each candidate item;
    input at least a portion of the plurality of features, the plurality of candidate items, and the plurality of candidate attributes for each item into the machine-learned display selection model; and
    receive, as an output of the machine-learned display selection model, the display structure that specifies both the plurality of items and one or more attributes for each item for inclusion in a search results page.

18. The one or more non-transitory computer-readable media of claim 17, wherein the machine-learned display selection model comprises one or more structured support vector machines, and wherein the machine-learned display selection model implements a nested greedy algorithm to optimize the nested submodular objective function.

19. The one or more non-transitory computer-readable media of claim 17, wherein the nested submodular objective function models one or more dependencies between attributes for two or more items included in the display structure.

* * * * *